US012769700B2

(12) United States Patent
Wang et al.

(10) Patent No.: US 12,769,700 B2
(45) Date of Patent: Oct. 20, 2026

(54) METHOD FOR MOUNTING A MULTI-MEDIA CARD AND AN APPARATUS, STORAGE MEDIUM, AND ELECTRONIC DEVICE

(71) Applicant: SUZHOU METABRAIN INTELLIGENT TECHNOLOGY CO., LTD., Suzhou (CN)

(72) Inventors: Xiangyu Wang, Suzhou (CN); Xiubo Zhang, Suzhou (CN); Yan Qu, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/164,977

(22) PCT Filed: May 30, 2025

(86) PCT No.: PCT/CN2025/098508
§ 371 (c)(1),
(2) Date: Sep. 12, 2025

(87) PCT Pub. No.: WO2026/066198
PCT Pub. Date: Apr. 2, 2026

(65) Prior Publication Data

US 2026/0119442 A1 Apr. 30, 2026

(30) Foreign Application Priority Data

Sep. 29, 2024 (CN) ........................ 202411372920.6

(51) Int. Cl.
*G06F 13/42* (2006.01)
*G06F 9/4401* (2018.01)

(52) U.S. Cl.
CPC ........ *G06F 13/4282* (2013.01); *G06F 9/4408* (2013.01)

(58) Field of Classification Search
CPC .......................... G06F 13/4282; G06F 9/4408
See application file for complete search history.

(56) References Cited

U.S. PATENT DOCUMENTS 11,409,678 B2 8/2022 Bhatia et al.
11,580,233 B1 * 2/2023 Wu ..................... G06F 3/0604
(Continued)

FOREIGN PATENT DOCUMENTS

CN 102855146 A 1/2013
CN 111176703 A 5/2020
(Continued)

OTHER PUBLICATIONS

The First search report of CN application No. 202411372920.6 issue on Nov. 1, 2024.
(Continued)

*Primary Examiner* — Henry Tsai
*Assistant Examiner* — Aurangzeb Hassan
(74) *Attorney, Agent, or Firm* — Scully, Scott, Murphy & Presser, P.C.

(57) ABSTRACT

Provided is a method for mounting a multi-media card and an apparatus, a storage medium, an electronic device, and a computer program product, wherein the method includes: determining a target device on which an Embedded Multi-Media Card (EMMC) needs to be mounted; in a case where it is determined that the target device is a Baseboard Management Controller (BMC), mounting the EMMC onto the BMC; and in a case where it is determined that the target device is a first host, mounting the EMMC onto a target Universal Serial Bus (USB) interface connected to the first host.

20 Claims, 3 Drawing Sheets

(56) References Cited

U.S. PATENT DOCUMENTS

| | | | | |
|---|---|---|---|---|
| 11,983,540 | B1 * | 5/2024 | Cudak | G06F 13/4282 |
| 2018/0107558 | A1 * | 4/2018 | Rahardjo | G06F 9/4406 |
| 2024/0211008 | A1 * | 6/2024 | Cudak | G06F 1/26 |
| 2024/0211274 | A1 * | 6/2024 | Cudak | G06F 9/4405 |
| 2024/0211316 | A1 | 6/2024 | Cudak et al. | |
| 2025/0028601 | A1 * | 1/2025 | Bhatia | G06F 9/4401 |
| 2025/0181132 | A1 * | 6/2025 | Nam | G06F 3/0653 |
| 2025/0217129 | A1 * | 7/2025 | Huang | G06F 8/65 |
| 2025/0315171 | A1 * | 10/2025 | Krishnamurthy | G06F 3/0655 |

FOREIGN PATENT DOCUMENTS

| | | | |
|---|---|---|---|
| CN | 114816935 | A | 7/2022 |
| CN | 115237445 | A | 10/2022 |
| CN | 118034722 | A | 5/2024 |
| CN | 118567732 | A | 8/2024 |
| CN | 118885222 | A | 11/2024 |

OTHER PUBLICATIONS

The search report of PCT application No. PCT/CN2025/098508 issue on Aug. 6, 2025.

The First office action of CN application No. 202411372920.6 issue on Nov. 5, 2024.

The search report of counterpart EP application 25764863.4 issued on Jun. 25, 2026.

* cited by examiner

METHOD FOR MOUNTING A MULTI-MEDIA CARD AND AN APPARATUS, STORAGE MEDIUM, AND ELECTRONIC DEVICE

CROSS-REFERENCE TO RELATED APPLICATION

This application is a National Stage of International Patent Application No: PCT/CN2025/098508 filed on May 30, 2025, which claims the benefit of the priority to Chinese Patent Application No. 202411372920.6, filed to the China National Intellectual Property Administration on Sep. 29, 2024 and entitled "A Method for Mounting a Multi-Media Card and an Apparatus, Storage Medium, and Electronic Device", the disclosure of which is hereby incorporated by reference in its entirety.

TECHNICAL FIELD

Embodiments of the present disclosure relate to the field of computers, and in particular, to a method for mounting a multi-media card and an apparatus, a storage medium, an electronic device, and a computer program product.

BACKGROUND

With the scale expansion of data centers and diversification of computing power, server management, as a core link of data center development, has gradually become the key to promoting technological innovation and improving service quality in the data centers. In the related art, server management is generally intranet management. Therefore, when performing some server management operations (such as server online and server upgrade), networking operations are required, which may lead to certain security risks.

SUMMARY

Embodiments of the present disclosure provide a method for mounting a multi-media card and an apparatus, a storage medium, an electronic device, and a computer program product, so as to at least solve the problem in the related art that certain security risks exist due to the need for networking operations when performing some server management operations.

According to one embodiment of the present disclosure, a method for mounting a multi-media card is provided, comprising: determining a target device on which an Embedded Multi-Media Card (EMMC) needs to be mounted; in a case where it is determined that the target device is a Baseboard Management Controller (BMC), mounting the EMMC onto the BMC; and in a case where it is determined that the target device is a first host, mounting the EMMC onto a target connection interface connected to the first host.

In one exemplary embodiment, the mounting the EMMC onto the BMC comprises: mounting the EMMC onto the BMC through a selector; the mounting the EMMC onto a target connection interface connected to the first host comprises: mounting the EMMC onto the target connection interface connected to the first host through the selector; wherein the selector comprises the BMC, or the selector comprises a Multiplexer (MUX), the MUX is connected respectively to the BMC, the target connection interface and the EMMC, and the MUX is configured to mount the EMMC under the control of the BMC In one exemplary embodiment, in a case where the EMMC is mounted onto the BMC through the selector, the BMC is configured to perform a server management task for a target server to which the BMC belongs, through server management software in the EMMC; and in a case where the EMMC is mounted onto the target connection interface connected to the first host through the selector, the EMMC is configured to be a boot medium of the target server.

In one exemplary embodiment, in a case where the selector comprises the MUX, the MUX and the EMMC are integrated on a hardware card, the hardware card is configured to be plugged into the BMC, and in a case where the hardware card is plugged into the BMC, a first port of the MUX is connected to the BMC, a second port of the MUX is connected to the target connection interface, and a third port of the MUX is connected to the EMMC, wherein, the mounting the EMMC onto the BMC through the selector comprises: establishing, by the selector under the control of the BMC, a communication path between the first port and the third port to mount the EMMC onto the BMC; and the mounting the EMMC onto the target connection interface connected to the first host through the selector comprises: establishing, by the selector under the control of the BMC, a communication path between the second port and the third port to mount the EMMC onto the target connection interface.

In one exemplary embodiment, in a case where the selector comprises the MUX, the MUX is integrated on the BMC, the EMMC is configured to be plugged into the BMC, and in a case where the EMMC is plugged into the BMC, a fourth port of the MUX is connected to the target connection interface, and a fifth port of the MUX is connected to the EMMC, wherein, the mounting the EMMC onto the BMC through the selector comprises: establishing, by the selector under the control of the BMC, a communication path between the BMC and the fifth port to mount the EMMC onto the BMC; and the mounting the EMMC onto the target connection interface connected to the first host through the selector comprises: establishing, by the selector under the control of the BMC, a communication path between the fourth port and the fifth port to mount the EMMC onto the target connection interface In one exemplary embodiment, in a case where the selector comprises the BMC and the EMMC is a media card built into the BMC, the mounting the EMMC onto the target connection interface connected to the first host through the selector comprises: reading data of system software stored in a target area of the EMMC; converting the data of system software to obtain target data recognizable by the first host; and mounting the target data onto the target connection interface.

In one exemplary embodiment, the converting the data of system software to obtain target data recognizable by the first host comprises: initializing the EMMC; determining which partition of the EMMC to read data from; sending a read command to the EMMC to acquire the data of system software of the determined partition; and converting the data of system software into a format recognizable by the first host to obtain the target data; and the mounting the target data onto the target connection interface comprises: transmitting a data stream of the target data to the target connection interface.

In one exemplary embodiment, the target connection interface is a connection interface of a hub configured in the BMC, and before mounting the target data onto the target connection interface, the method further comprises: determining devices pre-connected to each connection interface of the hub; and determining a first connection interface, which is connected to the first host from the devices, of the hub to be the target connection interface.

In one exemplary embodiment, the method further comprises: determining that the connection interface, which is connected to the first host, of the hub is changed from the first connection interface to a second connection interface; and terminating mounting the target data onto the first connection interface, and remounting the target data onto the second connection interface.

In one exemplary embodiment, the determining that the connection interface, which is connected to the first host, of the hub is changed from the first connection interface to a second connection interface comprises at least one of the following: determining that the connection interface connected to the first host of the hub is changed from the first connection interface to the second connection interface based on an internally recorded correspondence relationship, wherein the correspondence relationship is configured to record each connection interface of the hub and device information of corresponding one device, which is connected to the each connection interface, from the devices; and determining that the connection interface, which is connected to the first host, of the hub is changed from the first connection interface to the second connection interface based on a received switching instruction.

In one exemplary embodiment, in a case where the EMMC is a media card built into the BMC, the method further comprises at least one of the following: mounting a target area storing data of system software in the EMMC onto a connection interface of a front control board, to cause to perform a first processing on the data of system software by a second host in a case where the second host is connected to the connection interface of the front control board; and mounting the target area storing the data of system software in the EMMC onto a connection interface of a target hardware device, to cause to perform a second processing on the data of system software by the second host in a case where the second host is connected to the connection interface of the target hardware device.

In one exemplary embodiment, in a case where the second host is connected to the connection interface of the front control board or the connection interface of the target hardware device, the second host is configured to perform update operation of the system software, deletion operation of the system software, and read operation of the system software on the target area storing the data of system software in the EMMC through the connection interface of the front control board or the connection interface of the target hardware device.

In one exemplary embodiment, in a case where the EMMC is a media card built into the BMC, the method further comprises: receiving first processing information through a communication interface configured on the BMC, wherein the communication interface comprises at least one of the following: a redfish interface, a representational state transfer (restful) interface, an Intelligent Platform Management Interface (IPMI), and a Keyboard Controller Style (KCS) interface; and processing data of system software stored in a target area of the EMMC according to the first processing information.

In one exemplary embodiment, in a case where the EMMC is a media card built into the BMC and the EMMC is mounted onto the first host, the method further comprises: receiving second processing information through a communication interface configured on the BMC, and caching the second processing information in the BMC, wherein the communication interface comprises at least one of the following: a redfish interface, a restful interface, an Intelligent Platform Management Interface (IPMI), and a Keyboard Controller Style (KCS) interface; when the first host is being booted, booting the first host into a target connection device mounted onto the first host through interacting with the Basic Input Output System (BIOS) during a window period by the BMC, so as to start system software in the target connection device, wherein data of the system software is stored in a target area of the EMMC; and after the system software is booted, interacting with the system software according to preset logic, and transmitting the second processing information cached in the BMC to the system software to instruct the system software to perform an operation indicated by the second processing information.

In one exemplary embodiment, the interacting with the system software according to preset logic comprises: communicating with the system software by the BMC through a network interface, and communicating with the system software by the BMC through a keyboard control signal, wherein the system software is configured to acquire the second processing information and parse the second processing information.

In one exemplary embodiment, the method further comprises: acquiring an execution progress of the system software performing the operation indicated by the second processing information; and in a case where it is determined that the system software completes, based on the execution progress, the operation indicated by the second processing information, triggering an operation of rebooting the first host, and notifying the BIOS to change a boot medium of the first host from the target connection device to an original boot medium, so as to boot the first host in the original boot medium, wherein the original boot medium is a boot medium of the first host before booting the first host into the target connection device.

According to another embodiment of the present disclosure, an apparatus for mounting a multi-media card is provided, including: a determining module, configured to determine a target device on which an Embedded Multi-Media Card (EMMC) needs to be mounted; a first mounting module, configured to, in a case where it is determined that the target device is a Baseboard Management Controller (BMC), mount the EMMC onto the BMC; and a second mounting module, configured to, in a case where it is determined that the target device is a first host, mount the EMMC onto a target connection interface connected to the first host.

According to another embodiment of the present disclosure, a non-volatile computer readable storage medium is provided, in which a computer program is stored. The computer program is executed by a processor to implement the steps in any one of the above method embodiments.

According to another embodiment of the present disclosure, an electronic device is provided, including a memory, a processor, and a computer program stored in the memory and executable on the processor. The processor executes the computer program to implement the steps in any one of the above method embodiments.

According to another embodiment of the present disclosure, a computer program product is provided, including a computer program. The computer program is executed by a processor to implement the steps in any one of the above embodiments.

Through the present disclosure, under the control of the BMC, the EMMC may be mounted onto the BMC or to the target connection interface connected to the first host based on actual mounting requirements, so that the BMC may control a mounting manner of the EMMC. Therefore, the problem in the related art that certain security risks exist due to the need for networking operations when performing some server management operations is solved, thereby achieving the effect of improving the security of server management.

DETAILED DESCRIPTION OF THE EMBODIMENTS

Embodiments of the present disclosure are described below with reference to the drawings and in conjunction with the embodiments in detail.

It is to be noted that the terms "first", "second" and the like in the specification, claims and the above drawings of the present disclosure are used for distinguishing similar objects rather than describing a specific sequence or a precedence order.

Figure 1:
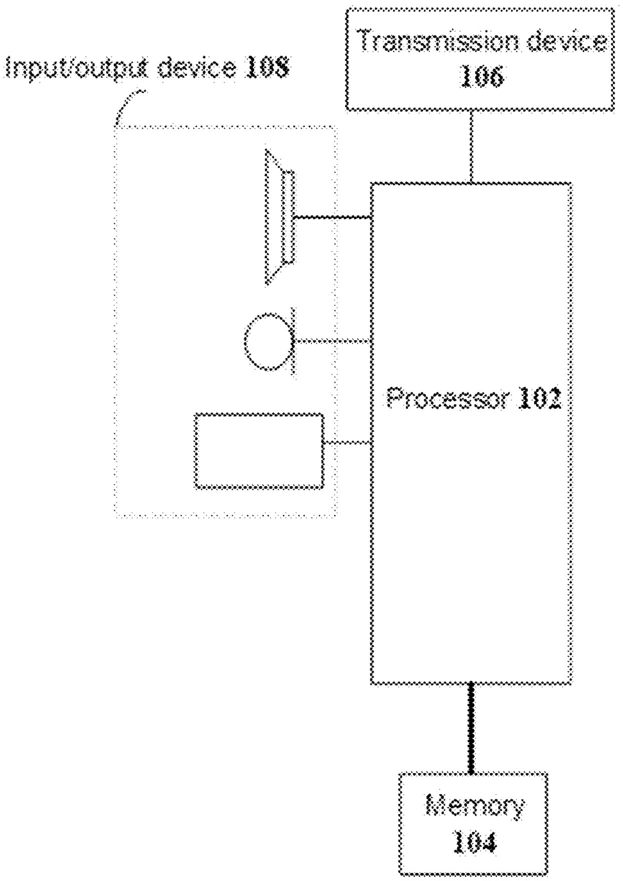
FIG. 1 is a block diagram of a hardware structure of a server device of a method for mounting a multi-media card according to an embodiment of the present disclosure.

The method embodiment provided by the embodiments of the present disclosure may be performed in a server device or a similar computing an apparatus. Taking running on the server device as an example, FIG. 1 is a block diagram of a hardware structure of a server device of a method for mounting a multi-media card according to an embodiment of the present disclosure. As shown in FIG. 1, the server device may include one or more (only one is shown in FIG. 1) processors 102 (the processors 102 may include, but are not limited to, processing apparatuses such as a Micro Controller Unit (MCU) or a Field Programmable Gate Array (FPGA)) and a memory 104 for storing data. The above server device may further include a transmission device 106 and an input/output device 108 for communication functions. Those of ordinary skill in the art may understand that the structure shown in FIG. 1 is only schematic and not intended to limit the structure of the above server device. For example, the server device may further include more or fewer components than those shown in FIG. 1, or have a different configuration from that shown in FIG. 1.

The memory 104 may be configured to store a computer program, for example, a software program or a module of application software, such as a computer program corresponding to a method for mounting a multi-media card in the embodiments of the present disclosure. The processor 102 runs the computer program stored in the memory 104 to perform various functional applications and data processing, that is, to implement the above method. The memory 104 may include a high speed Random Access Memory (RAM) and may further include a non-volatile memory such as one or more magnetic storage apparatuses, a flash, or other non-volatile solid state memories. In some examples, the memory 104 may further include memories remotely located relative to the processor 102, which may be connected to the server device over a network. Examples of the above network include, but are not limited to, the Internet, the intranet, a local area network, a mobile communication network, and a combination thereof.

The transmission module 106 is configured to receive or transmit data through a network. A specific example of the above network may include a wireless network provided by a communication provider of the server device. In one example, the transmission device 106 includes a Network Interface Controller (NIC) that may be connected to other network devices through a base station to communicate with the Internet. In one example, the transmission device 106 may be a Radio Frequency (RF) module, which is configured to communicate with the Internet in a wireless manner.

Figure 2:
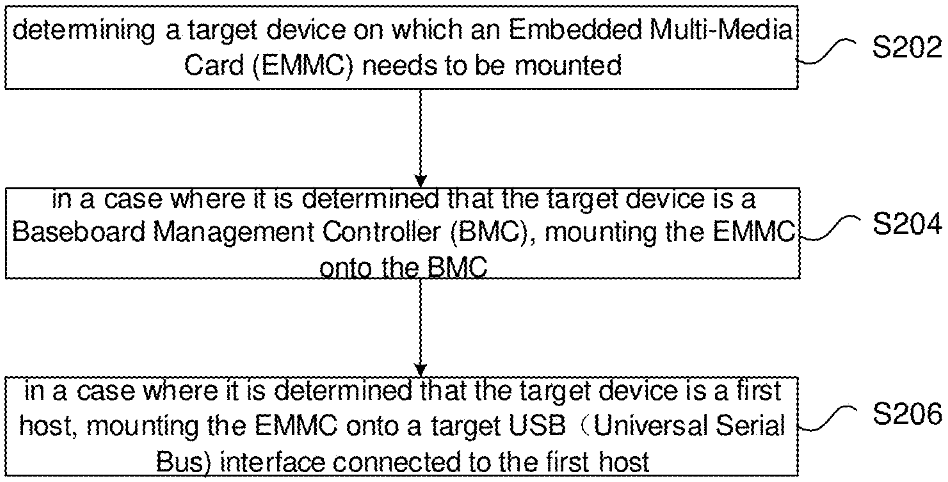
FIG. 2 is a flowchart of a method for mounting a multi-media card according to an embodiment of the present disclosure.

In the present embodiment, a method for mounting a multi-media card is provided. FIG. 2 is a flowchart of a method for mounting a multi-media card according to an embodiment of the present disclosure. As shown in FIG. 2, the flow includes the following steps.

At S202, determining a target device on which an Embedded Multi-Media Card (EMMC) needs to be mounted.

At S204, in a case where it is determined that the target device is a Baseboard Management Controller (BMC), mounting the EMMC onto the BMC.

At S206, in a case where it is determined that the target device is a first host, mounting the EMMC onto a target connection interface connected to the first host (the connection interface includes a Universal Serial Bus (USB) interface, or other physical interfaces having similar capabilities).

In the above steps, server management software is stored in the EMMC, and the server management software is configured to perform full-cycle management on a server. The full-cycle management of the server includes, but is not limited to, server online, upgrade, deployment, diagnosis and maintenance, data clearing, and the like. The storage capacity of the EMMC includes, but is not limited to, 4 Gigabyte (GB), 8 GB, 64 GB, 256 GB, and the like. Exemplarily, the EMMC may be selected based on the attributes of the EMMC (such as interface speed, storage capacity, read and write speed, power consumption, software support, physical size, and packaging type) according to the requirements of the application scenario.

The execution entity of the above steps may be, but is not limited to, the BMC, other server hardware management components having similar functions to the BMC, other components or devices associated with the BMC.

Through the above embodiment, under the control of the BMC, the EMMC may be mounted onto the BMC or to the target connection interface connected to the first host based on actual mounting requirements, so that the BMC may control a mounting manner of the EMMC. Therefore, the problem in the related art that certain security risks exist due to the need for networking operations when performing some server management operations is solved, thereby achieving the effect of improving the security of server management.

In one optional embodiment, the operation of mounting the EMMC onto the BMC includes: mounting the EMMC onto the BMC through a selector. The operation of mounting the EMMC onto the target connection interface connected to the first host includes: mounting the EMMC onto the target USB interface connected to the first host through the selector. The selector includes the BMC, or the selector includes a MUX connected to the BMC, the target USB interface, and the EMMC, and the MUX is configured to mount the EMMC under the control of the BMC.

In the above steps, the EMMC is mounted onto the BMC through the selector, so that the BMC may perform a server management task for a target server to which the BMC belongs through the server management software in the EMMC, and the EMMC is mounted onto the target USB interface connected to the first host through the selector, so that the EMMC is configured to be a boot medium of the target server, which further solves the problem in the related art that certain security risks exist due to the need for networking operations when performing some server management operations, thereby improving the security of server management.

In one optional embodiment, in a case where the selector includes the MUX, the MUX and the EMMC are integrated on a hardware card having the ability to be plugged into the BMC, and in a case where the hardware card is configured to be plugged into the BMC, a first port of the MUX is connected to the BMC, a second port of the MUX is connected to the target USB interface, and a third port of the MUX is connected to the EMMC. The mounting the EMMC onto the BMC through the selector comprises: establishing, by the selector under the control of the BMC, a communication path between the first port and the third port to mount the EMMC onto the BMC. The mounting the EMMC onto the target USB interface connected to the first host through the selector comprises: establishing, by the selector under the control of the BMC, a communication path between the second port and the third port to mount the EMMC onto the target USB interface.

Figure 3:
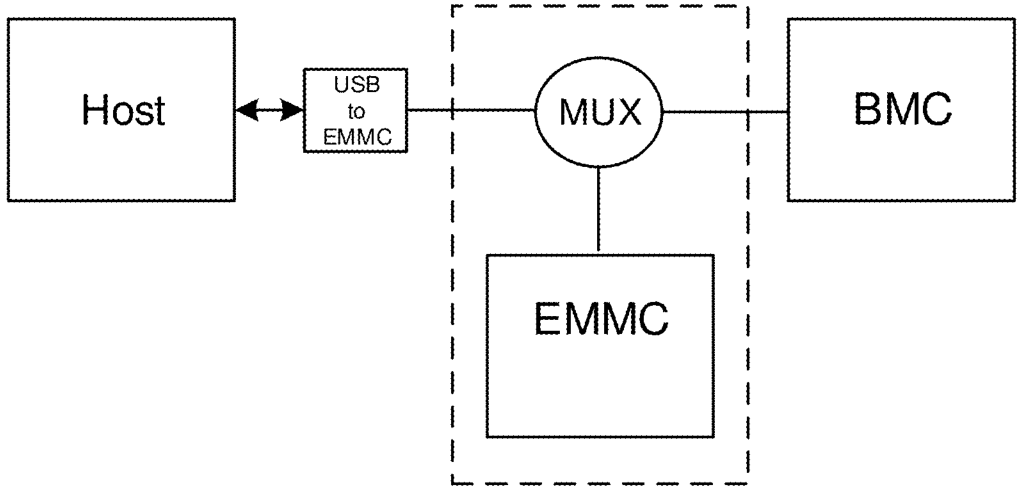
FIG. 3 is a first connection logic diagram of multi-media card mounting according to an embodiment of the present disclosure.

In the above steps, in some embodiments, the types of the hardware cards include, but are not limited to, a storage expansion card, an industrial control card, an embedded computing card, a server expansion card, a customized hardware card, and the like, and the hardware card includes, but is not limited to, being plugged into the BMC and connected to the BMC by being coupled to a Datacenter-ready Secure Control Module (DC-SCM) management board. FIG. 3 is a first connection logic diagram of multi-media card mounting according to an embodiment of the present disclosure. As shown in FIG. 3, exemplarily, the hardware card is connected to the BMC by being coupled to the DC-SCM management board, and the MUX may switch an EMMC connection object.

In one optional embodiment, in a case where the selector comprises the MUX, the MUX is integrated on the BMC, the EMMC is configured to be plugged into the BMC, and in a case where the EMMC is plugged into the BMC, a fourth port of the MUX is connected to the target USB interface, and a fifth port of the MUX is connected to the EMMC. The mounting the EMMC onto the BMC through the selector comprises: establishing, by the selector under the control of the BMC, a communication path between the BMC and the fifth port to mount the EMMC onto the BMC. The mounting the EMMC onto the target USB interface connected to the first host through the selector comprises: establishing, by the selector under the control of the BMC, a communication path between the fourth port and the fifth port to mount the EMMC onto the target USB interface.

Figure 4:
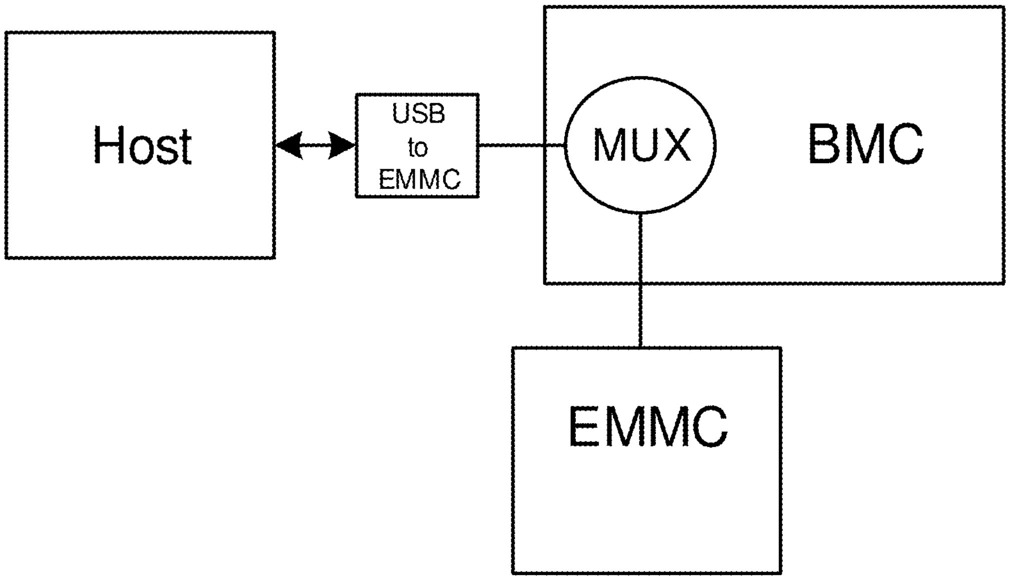
FIG. 4 is a second connection logic diagram of multi-media card mounting according to an embodiment of the present disclosure.

In the above steps, the target USB interface includes, but is not limited to, USB Type-A, Type-B, Mini USB, Micro USB, and the like. FIG. 4 is a second connection logic diagram of multi-media card mounting according to an embodiment of the present disclosure.

In one optional embodiment, in a case where the selector comprises the BMC and the EMMC is a media card built into the BMC, the mounting the EMMC onto the target USB interface connected to the first host through the selector comprises: reading data of system software stored in a target area of the EMMC; converting the data of system software to obtain target data recognizable by the first host; and mounting the target data onto the target USB interface.

Figure 5:
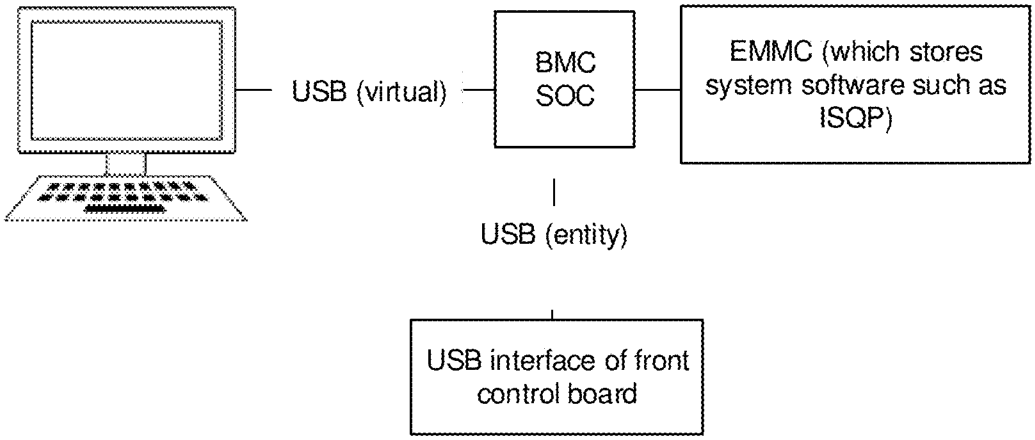
FIG. 5 is an architectural diagram of multi-media card mounting according to an embodiment of the present disclosure.

In some embodiments, the first host includes, but is not limited to, a server, a Personal Computer (PC), a network device, a storage device (such as a Network Attached Storage (NAS) and a Storage Area Network (SAN) controller), a virtual machine, and the like. The target area includes, but is not limited to, a boot area partition, a Replay Protected Memory Block (RPMB) partition, a general purpose partition, and a user data area. In some embodiments, the execution entity that executes the above steps may be the BMC. FIG. 5 is an architecture diagram of multi-media card mounting according to an embodiment of the present disclosure. As shown in FIG. 5, the BMC includes, but is not limited to, converting the data of system software to obtain the target data in the following manner: the BMC initializes the EMMC (such as configuring a communication protocol, a clock frequency, and a data path); the BMC determines which partition of the EMMC to read data from; the BMC sends a read command to the EMMC to acquire the data of system software of the determined partition; the BMC converts the data of system software into a format recognizable by the first host to obtain the target data; and the BMC mounts the format-converted data to the target USB interface (i.e., a USB interface of a front control board shown in FIG. 5), so that it is visible to the host connected to the interface, where a virtual USB storage device may be pre-created on the BMC, or the BMC directly transmits a data stream to the target USB interface.

In the above step, by converting the data of system software in the EMMC, it may be ensured that the format of the data of system software is compatible with the first host, so that the host can effectively read and utilize the data of system software, and directly mount the converted data of system software to the USB interface, thereby simplifying the data access process.

In one optional embodiment, the target USB interface is a USB interface of a USB hub configured in the BMC, and before the BMC mounts the target data onto the target USB interface, the method further includes: determining devices pre-connected to each USB interfaces of the USB hub; and determining a first USB interface connected to the first host of the USB hub to be the target USB interface.

In the above steps, the devices connected to the respective USB interfaces include, but are not limited to, an input device configured as a remote management server (such as a keyboard and a mouse), a USB storage device (such as a USB disk and an external hard drive), a network adapter, a debugging and testing device, a communication module of the USB interface, and the like. In some embodiments, the execution entity that executes the above steps may be the BMC.

In one optional embodiment, the method further includes: determining that the USB interface connected to the first host of the USB hub is changed from the first USB interface to a second USB interface; and terminating mounting the target data onto the first USB interface, and remounting the target data onto the second USB interface.

In some embodiments, the execution entity that executes the above steps may be the BMC.

In one optional embodiment, the operation of determining that the USB interface connected to the first host of the USB hub is changed from the first USB interface to the second USB interface includes at least one of the following: determining that the USB interface connected to the first host of the USB hub is changed from the first USB interface to the second USB interface based on an internally recorded correspondence relationship, where the correspondence relationship configured to record each USB interface of the USB hub and device information of the devices connected to each USB interface; and determining that the USB interface connected to the first host in the USB hub is changed from the first USB interface to the second USB interface based on a received switching instruction.

In some embodiments, the execution entity that executes the above steps may be the BMC. In the above steps, the BMC replaces a converter MUX by using a virtual media mounting technology. Since the BMC uses the USB hub in the chip, and the connection position of each port of the USB hub may freely select a hardware connection according to the design of a server system, the BMC may mount system software to different USB ports of the USB hub of the BMC as needed, and virtualize a bootable USB device for the first host by mounting the system software to the USB port of the first host, thereby providing a way to boot the host for the system software directly. Through the above steps, the use of the additional hardware MUX is avoided, the hardware cost is reduced, and the interface expansion may be achieved through the virtual media mounting technology of the BMC, thereby adapting to different server system design and hardware connection requirements.

In one optional embodiment, in a case where the EMMC is a media card built into the BMC, the method further includes at least one of the following: mounting a target area storing data of system software in the EMMC onto the USB interface of the front control board, to cause to perform a first processing on the data of system software by a second host in a case where the second host is connected to the USB interface of the front control board; and mounting the target area storing the data of system software in the EMMC onto a USB interface of a target hardware device, to cause to perform a second processing on the data of system software by the second host in a case where the second host is connected to the USB interface of the target hardware device.

In some embodiments, the execution entity that executes the above steps may be the BMC. In the above steps, the BMC uses a virtual storage mounting technology to selectively mount the partition or folder of the EMMC of the BMC loaded with the system software to the USB interface of the front control board or other hardware, so that the partition or folder of the EMMC loaded with the system software is virtualized into a physical storage U disk, and when the host and a USB master controller are connected to the USB interface of the front control board or other hardware, the partition or folder loaded with the system software in the EMMC may be updated, deleted and read through the USB interface of the hardware, thereby improving maintainability.

In one optional embodiment, in a case where the EMMC is a media card built into the BMC, the method further includes: receiving first processing information through a communication interface configured on the BMC, where the communication interface includes at least one of the following: a redfish interface, a representational state transfer restful interface, an IPMI, and a KCS interface; and processing the data of system software stored in the target area of the EMMC according to the first processing information.

In some embodiments, the execution entity that executes the above steps may be the BMC. In some embodiments, the first processing information includes, but is not limited to, modification information of the system software, update information of the system software, and deletion information of the system software. In the above steps, the BMC may update and maintain the data of system software stored in the EMMC through the communication interface by receiving the first processing information and processing the data of system software according to the first processing information, thereby providing a convenient update path in the server production and maintenance links, and improving the user experience of the system software.

In one optional embodiment, in a case where the EMMC is a media card built into the BMC, and the EMMC is mounted onto the first host, the method further includes: receiving second processing information through a communication interface configured on the BMC, and caching the second processing information in the BMC, where the communication interface includes at least one of the following: a redfish interface, a restful interface, an IPMI, and a KCS interface; when the first host is booted, booting the first host into a target connection device mounted under the first host by interacting with a BIOS during a window period, so as to start system software within the target connection device, where data of system software is stored in a target area of the EMMC; and after the system software is booted, interacting with the system software according to preset logic by the BMC, and transmitting the second processing information cached in the BMC to the system software, so as to instruct the system software to perform an operation indicated by the second processing information.

In some embodiments, the execution entity that executes the above steps may be the BMC. In the above steps, the second processing information includes, but is not limited to, a system software function instruction (such as a system software startup instruction, a system software function execution instruction, and an execution status query instruction), and the system software function instruction includes, but is not limited to, various instructions of a system software online server, various instructions of the system software to upgrade the server system (such as firmware and component upgrade), various instructions of the system software to deploy the server (such as a Redundant Array of Independent Disks (RAID) configuration and various parameter configurations), a daily maintenance data collection instruction of the system software, a one-key erase function instruction of the server, and the like. The BMC includes, but is not limited to, interacting with the system software according to the preset logic in the following manner: the system software communicates with the BMC through a network interface, and the system software communicates with the BMC through a keyboard control signal; the system software acquires the second processing information from the BMC; and the system software parses the second processing information.

In one optional embodiment, the method further includes: acquiring an execution progress of the system software in performing the operation indicated by the second processing information; and in a case where it is determined that the system software performs, based on the execution progress, the operation indicated by the second processing information, triggering an operation of rebooting the first host, and notifying the BIOS to change a boot medium of the first host from a target USB device to an original boot medium, so as to boot the first host in the original boot medium, where the original boot medium is the boot medium of the first host before booting the first host into the target USB device.

In some embodiments, the execution entity that executes the above steps may be the BMC. In the above steps, since the reboot is automatically performed when the operation indicated by the second processing information is executed, and the BIOS is notified to switch the boot medium of the first host to the original boot medium, without user operation, the problems of possible errors and untimely operation caused by manual operation are avoided, the stability is enhanced, and the user experience is improved.

Through the above description of implementations, those skilled in the art may clearly know that the method according to the above embodiments may be implemented by means of software plus a necessary common hardware platform, certainly by means of hardware; but in many cases, the former is the better implementation. Based on such understanding, the technical solution of the present disclosure, which is essential or contributes to the conventional art, may be embodied in the form of a software product. The computer software product is stored in a storage medium (such as a Read-Only Memory (ROM)/RAM, a magnetic disk and an optical disc), including a number of instructions for causing a terminal device (which may be a mobile phone, a computer, a server, or a network device, etc.) to perform the methods described in various embodiments of the present disclosure.

In the present embodiment, an apparatus for mounting a multi-media card is further provided. The apparatus is configured to implement the above embodiments and optional implementations. The embodiments and optional implementations that have been elaborated will not be repeated here. The term "module" used below may realize a combination of software and/or hardware with a predetermined function. Although the apparatus described in the following embodiment is preferably realized by software, but by hardware or a combination of software and hardware is also possible and conceived.

Figure 6:
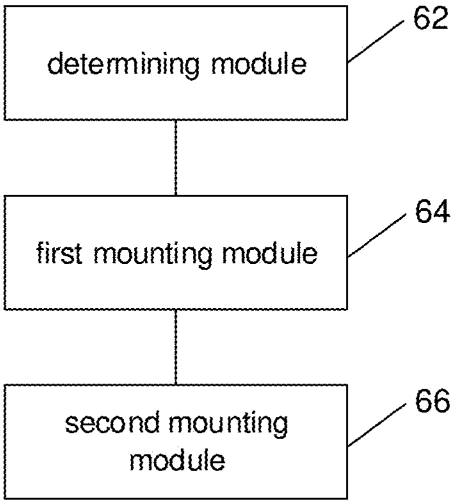
FIG. 6 is a structural block diagram of an apparatus for mounting a multi-media card according to an embodiment of the present disclosure.

FIG. 6 is a structural block diagram of an apparatus for mounting a multi-media card according to an embodiment of the present disclosure, and as shown in FIG. 6, the mounting apparatus includes: a determining module 62, configured to determine a target device on which an EMMC needs to be mounted; a first mounting module 64, configured to, in a case where it is determined that the target device is a BMC, mount the EMMC onto the BMC; and a second mounting module 66, configured to, in a case where it is determined that the target device is a first host, mount the EMMC onto a target connection interface connected to the first host.

In one optional embodiment, the above first mounting module 64 and the second mounting module 66 may include a selector, the selector comprising the BMC, or the selector comprising a MUX, the MUX being connected respectively to the BMC, the target USB interface, and the EMMC, and the MUX being configured to mount the EMMC under the control of the BMC.

In one optional embodiment, in a case where the selector includes the MUX, the MUX and the EMMC are integrated on a hardware card configured to be plugged into the BMC, and in a case where the hardware card is plugged into the BMC, a first port of the MUX is connected to the BMC, a second port of the MUX is connected to the target USB interface, and a third port of the MUX is connected to the EMMC. The first mounting module 64 includes: a first conduction unit, configured to establish a communication path between the first port and the third port under the control of the BMC to mount the EMMC onto the BMC. The second mounting module 66 includes: a second conduction unit, configured to establish a communication path between the second port and the third port under the control of the BMC to mount the EMMC onto the target USB interface.

In one optional embodiment, in a case where the selector includes the MUX, the MUX is integrated on the BMC, the EMMC is configured to be plugged into the BMC, and in a case where the EMMC is plugged into the BMC, a fourth port of the MUX is connected to the target USB interface, and a fifth port of the MUX is connected to the EMMC. The first mounting module 64 includes: a third conduction unit, configured to establish a communication path between the BMC and the fifth port under the control of the BMC to mount the EMMC onto the BMC. The second mounting module 66 includes: a fourth conduction unit, configured to establish a communication path between the fourth port and the fifth port under the control of the BMC to mount the EMMC onto the target USB interface.

In one optional embodiment, in a case where the selector includes the BMC and the EMMC is a media card built into the BMC, the second mounting module 66 includes: a reading unit, configured to read data of system software stored in a target area of the EMMC; a conversion unit, configured to convert the data of system software to obtain target data recognizable by the first host; and a mounting unit, configured to mount the target data onto the target USB interface.

In one optional embodiment, the target USB interface is a USB interface of a USB hub configured in the BMC, and the apparatus further includes: a first determining module, configured to, before mounting the target data onto the target USB interface, determine devices pre-connected to each USB interface of the USB hub; and a second determining module, configured to determine a first USB interface connected to the first host of the USB hub to be the target USB interface.

In one optional embodiment, the apparatus further includes: a third determining module, configured to determine that the USB interface connected to the first host of the USB hub is changed from the first USB interface to a second USB interface; and a termination module, configured to terminate mounting the target data onto the first USB interface, and remount the target data onto the second USB interface.

In one optional embodiment, the third determining module includes at least one of the following: a first determination unit, configured to determine that the USB interface connected to the first host of the USB hub is changed from the first USB interface to the second USB interface based on an internally recorded correspondence relationship, where the correspondence relationship is configured to record each USB interface of the USB hub and device information of the devices connected to each USB interface; and a second determination unit, configured to determine that the USB interface connected to the first host in the USB hub is changed from the first USB interface to the second USB interface based on a received switching instruction.

In one optional embodiment, in a case where the EMMC is a media card built into the BMC, the BMC further includes: a first processing module, configured to mount a target area storing data of system software in the EMMC to a USB interface of a front control board, so that a second host performs first processing on the data of system software when connected to the USB interface of the front control board; and a second processing module, configured to mount the target area storing the data of system software in the EMMC onto a USB interface of a target hardware device, to cause to perform a second processing on the data of system software by the second host in a case where the second host is connected to the USB interface of the target hardware device.

In one optional embodiment, where the EMMC is a media card built into the BMC, the apparatus further includes: a first receiving module, configured to receive first processing information through a communication interface configured on the BMC, where the communication interface includes at least one of the following: a redfish interface, a representational state transfer restful interface, an IPMI, and a KCS interface; and a third processing module, configured to process data of system software stored in a target area of the EMMC according to the first processing information.

In one optional embodiment, in a case where the EMMC is a media card built into the BMC, and the EMMC is mounted onto the first host, the apparatus further includes: a second receiving module, configured to receive second processing information through a communication interface configured on the BMC, and cache the second processing information in the BMC, where the communication interface includes at least one of the following: a redfish interface, a restful interface, an IPMI, and a KCS interface; a third mounting module, configured to, when the first host is being booted, boot the first host into a target connection device mounted onto the first host by interacting with a BIOS during a window period, so as to start system software within the target connection device, where data of system software is stored in a target area of the EMMC; and an interaction module, configured to, after the system software is booted, interact with the system software according to preset logic, and transmit the second processing information cached in the BMC to the system software, so as to instruct the system software to perform an operation indicated by the second processing information.

In one optional embodiment, the apparatus further includes: an acquisition module, configured to acquire an execution progress of the system software in performing the operation indicated by the second processing information; and a triggering module, configured to, in a case where it is determined that the system software performs, based on the execution progress, the operation indicated by the second processing information, trigger an operation of rebooting the first host, and notify the BIOS to change a boot medium of the first host from a target USB device to an original boot medium, so as to boot the first host in the original boot medium, where the original boot medium is the boot medium of the first host before booting the first host into the target USB device.

It is to be noted that, each of the above modules may be realized by software or hardware. For the latter, the each of the above modules may be realized by, but is not limited to, the following way: all of the above modules are in the same processor; or, the above modules are respectively in different processors in form of any combination.

The embodiments of the present disclosure further provide a computer-readable storage medium, in which a computer program is stored. The computer program is configured to execute, when running, the steps in any of the above method embodiments.

In one exemplary embodiment, the above computer-readable storage medium may include, but is not limited to, a U disk, an ROM, an RAM, a mobile hard disk, a magnetic disk, a compact disc, and other media capable of storing the computer program.

The embodiments of the present disclosure further provide an electronic device, including a memory and a processor. A computer program is stored in the memory, and the processor is configured to run the computer program to execute the steps in any of the above method embodiments.

In one exemplary embodiment, the above electronic device may further include a transmission device and an input/output device. The transmission device is connected with the above processor, and the input/output device is connected to the above processor.

The embodiments of the present disclosure further provide a computer program product. The above computer program product includes a computer program. The computer program is executed by a processor to implement the steps in any one of the above method embodiments.

The specific examples in the present embodiment may refer to the above embodiments and the examples described in the exemplary implementations, which will not be elaborated herein.

It is apparent that those skilled in the art should appreciate that the above modules and steps of the present disclosure may be implemented by a general-purpose computing apparatus, and they may be centralized in a single computing apparatus or distributed on a network composed of multiple computing apparatuses; they may be implemented by a program code which is capable of being executed by the computing apparatus, so that they may be stored in a storage apparatus and executed by the computing apparatus; and in some situations, the presented or described steps may be executed in an order different from that described here; or they are made into integrated circuit modules, respectively; or multiple modules and steps of them are made into a single integrated circuit module to realize. In this way, the present disclosure is not limited to any particular combination of hardware and software.

The above are only the optional embodiments of the present disclosure, and are not intended to limit the present disclosure, and for those of ordinary skill in the art, various modifications and changes may be made to the present disclosure. Any modifications, equivalent substitutions, improvements and the like made within the principle of the present disclosure shall fall within the scope of protection of the present disclosure.

The invention claimed is:

1. A method for mounting a multi-media card, comprising:

determining a target device on which an Embedded Multi-Media Card (EMMC) needs to be mounted;

in a case where it is determined that the target device is a Baseboard Management Controller (BMC), mounting the EMMC onto the BMC; and in a case where it is determined that the target device is a first host, mounting the EMMC onto a target connection interface connected to the first host;

wherein the mounting the EMMC onto a target connection interface connected to the first host comprises: mounting the EMMC onto the target connection interface connected to the first host through a selector;

wherein in a case where the selector comprises a Multiplexer (MUX), the MUX is connected respectively to the BMC, the target connection interface and the EMMC, and the MUX is configured to mount the EMMC under the control of the BMC;

the MUX and the EMMC are integrated on a hardware card, the hardware card is configured to be plugged into the BMC, and in a case where the hardware card is plugged into the BMC, a first port of the MUX is connected to the BMC, a second port of the MUX is connected to the target connection interface, and a third port of the MUX is connected to the EMMC;

the mounting the EMMC onto the target connection interface connected to the first host through the selector comprises: establishing, by the selector under the control of the BMC, a communication path between the second port and the third port to mount the EMMC onto the target connection interface.

2. The method according to claim 1, wherein, the mounting the EMMC onto the BMC comprises: mounting the EMMC onto the BMC through the selector;

wherein the selector comprises the BMC, or the selector comprises the MUX.

3. The method according to claim 2, wherein, in a case where the EMMC is mounted onto the BMC through the selector, the BMC is configured to perform a server management task for a target server to which the BMC belongs, through server management software in the EMMC; and in a case where the EMMC is mounted onto the target connection interface connected to the first host through the selector, the EMMC is configured to be a boot medium of the target server.

4. The method according to claim 2, wherein in a case where the selector comprises the MUX, the mounting the EMMC onto the BMC through the selector comprises: establishing, by the selector under the control of the BMC, a communication path between the first port and the third port to mount the EMMC onto the BMC.

5. The method according to claim 2, wherein in a case where the selector comprises the MUX, the MUX is integrated on the BMC, the EMMC is configured to be plugged into the BMC, and in a case where the EMMC is plugged into the BMC, a fourth port of the MUX is connected to the target connection interface, and a fifth port of the MUX is connected to the EMMC, wherein, the mounting the EMMC onto the BMC through the selector comprises: establishing, by the selector under the control of the BMC, a communication path between the BMC and the fifth port to mount the EMMC onto the BMC; and the mounting the EMMC onto the target connection interface connected to the first host through the selector comprises: establishing, by the selector under the control of the BMC, a communication path between the fourth port and the fifth port to mount the EMMC onto the target connection interface.

6. The method according to claim 2, wherein in a case where the selector comprises the BMC and the EMMC is a media card built into the BMC, the mounting the EMMC onto the target connection interface connected to the first host through the selector comprises:

reading data of system software stored in a target area of the EMMC;

converting the data of system software to obtain target data recognizable by the first host; and mounting the target data onto the target connection interface.

7. The method according to claim 6, wherein, the converting the data of system software to obtain target data recognizable by the first host comprises: initializing the EMMC; determining which partition of the EMMC to read data from; sending a read command to the EMMC to acquire the data of system software of the determined partition; and converting the data of system software into a format recognizable by the first host to obtain the target data; and the mounting the target data onto the target connection interface comprises: transmitting a data stream of the target data to the target connection interface.

8. The method according to claim 6, wherein the target connection interface is a connection interface of a hub configured in the BMC, and before mounting the target data onto the target connection interface, the method further comprises:

determining devices pre-connected to each connection interface of the hub; and determining a first connection interface, which is connected to the first host from the devices, of the hub to be the target connection interface.

9. The method according to claim 8, wherein the method further comprises:

determining that the connection interface, which is connected to the first host, of the hub is changed from the first connection interface to a second connection interface which is connected to the first host; and terminating mounting the target data onto the first connection interface, and remounting the target data onto the second connection interface.

10. The method according to claim 9, wherein the determining that the connection interface, which is connected to the first host, of the hub is changed from the first connection interface to a second connection interface comprises at least one of the following:

determining that the connection interface, which is connected to the first host, of the hub is changed from the first connection interface to the second connection interface based on an internally recorded correspondence relationship, wherein the correspondence relationship is configured to record each connection interface of the hub and device information of corresponding one device, which is connected to the each connection interface, from the devices;

determining that the connection interface, which is connected to the first host, of the hub is changed from the first connection interface to the second connection interface based on a received switching instruction.

11. The method according to claim 2, wherein in a case where the EMMC is a media card built into the BMC, the method further comprises at least one of the following:

mounting a target area storing data of system software in the EMMC onto a connection interface of a front control board, to cause to perform a first processing on the data of system software by a second host in a case where the second host is connected to the connection interface of the front control board; and mounting the target area storing the data of system software in the EMMC onto a connection interface of a target hardware device, to cause to perform a second processing on the data of system software by the second host in a case where the second host is connected to the connection interface of the target hardware device.

12. The method according to claim 11, wherein in a case where the second host is connected to the connection interface of the front control board or the connection interface of the target hardware device, the second host is configured to perform update operation of the system software, deletion operation of the system software, and read operation of the system software on the target area storing the data of system software in the EMMC through the connection interface of the front control board or the connection interface of the target hardware device.

13. The method according to claim 2, wherein in a case where the EMMC is a media card built into the BMC, the method further comprises:

receiving first processing information through a communication interface configured on the BMC, wherein the communication interface comprises at least one of the following: a redfish interface, a representational state transfer (restful) interface, an Intelligent Platform Management Interface (IPMI), and a Keyboard Controller Style (KCS) interface; and processing data of system software stored in a target area of the EMMC according to the first processing information.

14. The method according to claim 2, wherein in a case where the EMMC is a media card built into the BMC and the EMMC is mounted onto the first host, the method further comprises:

receiving second processing information through a communication interface configured on the BMC, and caching the second processing information in the BMC, wherein the communication interface comprises at least one of the following: a redfish interface, a restful interface, an Intelligent Platform Management Interface (IPMI), and a Keyboard Controller Style (KCS) interface;

when the first host is being booted, booting the first host into a target connection device mounted onto the first host through interacting with a Basic Input Output System (BIOS) during a window period by the BMC, so as to start system software in the target connection device, wherein data of the system software is stored in a target area of the EMMC; and after the system software is booted, interacting with the system software according to preset logic by the BMC, and transmitting the second processing information cached in the BMC to the system software to instruct the system software to perform an operation indicated by the second processing information.

15. The method according to claim 14, wherein the interacting with the system software by the BMC according to preset logic comprises:

communicating with the system software by the BMC through a network interface, and communicating with the system software by the BMC through a keyboard control signal, wherein the system software is configured to acquire the second processing information and parse the second processing information.

16. The method according to claim 14, wherein the method further comprises:

acquiring an execution progress of the system software performing the operation indicated by the second processing information; and in a case where it is determined that the system software completes, based on the execution progress, the operation indicated by the second processing information, triggering an operation of rebooting the first host, and notifying the BIOS to change a boot medium of the first host from the target connection device to an original boot medium, so as to boot the first host in the original boot medium, wherein the original boot medium is a boot medium of the first host before booting the first host into the target connection device.

17. A non-volatile computer readable storage medium, wherein a computer program is stored in the non-volatile computer readable storage medium, the computer program is configured to, when executed by a processor, implement steps of the method according to claim 1.

18. An electronic device, comprising a memory, a processor, and a computer program stored in the memory and executable on the processor, wherein the processor is configured to implement steps of the method according to claim 1 when executing the computer program.

19. A computer program product, comprising a computer program, wherein the computer program is configured to, when executed by a processor, implement steps of the method according to claim 1.

20. An electronic device, comprising a memory, a processor, and a computer program stored in the memory and executable on the processor, wherein the processor is configured to implement steps of the method according to claim 2 when executing the computer program.

* * * * *